United States Patent [19]

Thompson et al.

[11] 4,402,343

[45] Sep. 6, 1983

[54] ANIMAL WATERING VALVE WITH PROTECTED BIASING SPRING

[75] Inventors: Earl C. Thompson, P.O. Box 549, Hewitt, Tex. 76643; Morris C. Keller, Dallas, Tex.; Francis Rustin, Springfield, Mo.

[73] Assignee: Earl Clayton Thompson, Hewitt, Tex.

[21] Appl. No.: 427,617

[22] Filed: Sep. 29, 1982

Related U.S. Application Data

[63] Continuation of Ser. No. 233,834, Feb. 12, 1981, abandoned, which is a continuation-in-part of Ser. No. 3,006, Jan. 12, 1979, abandoned.

[51] Int. Cl.$^3$ .......................... F16K 31/00; A01K 7/00
[52] U.S. Cl. ............................ 137/614.2; 137/614.19; 251/339; 119/72.5; 119/75
[58] Field of Search .................. 119/72.5, 75; 251/339

[56] References Cited

U.S. PATENT DOCUMENTS

| | | | |
|---|---|---|---|
| 3,513,811 | 5/1970 | Graham | 119/72.5 |
| 3,887,165 | 6/1975 | Thompson | 251/339 |
| 3,941,094 | 3/1976 | Nilsen, Jr. | 119/75 |
| 4,133,345 | 1/1979 | Mitchell | 251/339 |

Primary Examiner—A. Michael Chambers
Attorney, Agent, or Firm—Peter J. Murphy

[57] ABSTRACT

A valve body has a larger bore and a smaller bore defining a transverse valve seat; and a plug closes the larger bore, the inner end confronting the valve seat and defining a radially enlarged valve chamber. The valve closure member comprises an enlarged head seating on the valve seat and an integral stem projecting from the discharge end of the valve. The plug has an axial recess opening toward the valve seat; and a control member comprises an enlarged head and an integral stem. A helical biasing spring is received over the control member stem; and the stem and spring are received within the plug recess to permit free axial movement over the valve closure member and free compression and expansion of the spring. The control member, which engages the closure member head to seat the closure member, has small lateral clearance with associated parts to severely restrict lateral movement of the control member and of the spring. When used with a drinker cup, the closure member stem of the valve projects axially into the cup; and a weighted valve operator disposed over the free end of the stem and extending laterally beyond the valve housing, assists newly hatched chicks to actuate the stem to open the valve. A ball check valve prevents siphoning of water from the drinker cup back through the valve.

18 Claims, 11 Drawing Figures

ANIMAL WATERING VALVE WITH PROTECTED BIASING SPRING

BACKGROUND AND SUMMARY OF THE INVENTION

This is a continuation of application Ser. No. 233,834, filed Feb. 12, 1981, now abandoned, which is a continuation-in-part of application Ser. No. 003,006, filed Jan. 12, 1979, now abandoned.

This invention relates to a nibbler valve of the type having a projecting stem movable by animals or fowl to open the valve and release drinking water; and more particularly to a valve having a spring-biased valve closure member with an improved spring mounting design.

In valves of this type, it is desirable to provide a biasing spring to assist in the seating of the valve closure member, after operation by an animal or fowl, to assure that the closure member is fully seated and that there will be no leakage or dripping of water between times of use. Although various types of springs may be used, a helical type compression spring is effective and economical.

A problem with the use of helical compression springs in valves of this type, is that they are subject to bending and distortion as opposed to purely axial compression and expansion. This results from the fact that the springs bear on the valve closure member, and that the valve closure member in normal operation is subject to rocking movement and lateral movement relative to the valve seat. If the helical compression spring is not appropriately confined within the valve, the end of the spring bearing on the closure member is subject to the above mentioned bending and distortion, and may be further subject to lateral displacement resulting in the hanging up of the spring on the lip of a confining recess; and this produces abnormal flexing of a limited number of coils at the end of the spring bearing on the closure member. In a typical valve, the helical spring is relatively long; and a substantial portion of the spring is confined within a coaxial recess in the valve housing, with a smaller portion of the spring extending into the valve chamber and engaging the valve closure member. The end of the spring, exposed in the valve chamber, may or may not be laterally confined relative to the closure member. Whether or not it is laterally confined, since the head of the valve closure member may move laterally relative to the valve chamber, and does move laterally in normal operation of the valve, the spring may hang up on the lip of the confining recess. When this occurs only a small number of spring coils are subject to compression and expansion and this results in premature fatigue failure of those limited coils. Additionally, the spring may become jammed between this lip and the valve closure member resulting in physical damage to the spring and again premature breakage.

An object of this invention is to provide a nibbler valve with an improved biasing spring and support design, to minimize premature spring failure.

Another object of this invention is to provide a nibbler valve with a helical biasing spring for the valve closure member, wherein lateral movement of the biasing spring is prevented.

A further object of this invention is to provide a nibbler valve with a spring-biased closure member which is self-squaring on the valve seat.

Still another object of this invention is to provide a nibbler valve which is very easy to operate by very young fowl.

A still further object of this invention is to provide a nibbler valve and cup combination for operation by newly hatched chicks.

These objects are attained in a valve which comprises broadly a housing having an inner end and an outer end, a chamber, a central passage opening to the outer end of the housing from the chamber, and an internal annular shoulder surrounding the passage and defining a valve seat. A valve closure member comprises an elongated stem with a radially enlarged head at one end. The head is configured to seat on the valve seat and provide clearance with the chamber, and the stem is dimensioned for annular clearance with the passage and to project from the housing outer end to enable rocking of the valve closure member. A valve control member is disposed in the housing for axial reciprocating movement and comprises an axial stem with a radially enlarged head at one end. The control member head confronts and engages the closure member head; and a helical compression spring is disposed over the control member stem with one end bearing on the head, and the other end of the spring bearing on means on the housing. The control member stem extends into the means on the housing such that the means on the housing, the control member stem and the spring coact to confine the control member and the spring against lateral movement within the housing. The control member is urged by the spring to seat the valve closure member on the valve seat.

The novel features and the advantages of the invention, as well as additional objects thereof, will be understood more fully from the following description when read in connection with the accompanying drawings.

DESCRIPTION OF THE PREFERRED EMBODIMENTS

FIGS. 1 through 4 of the drawing illustrate one form of valve according to the invention. The valve includes an elongated generally cylindrical body 11 having exterior threads 12 formed at one end, referred to as the inner end, for threading the valve into a suitable water supply member shown as a water pipe or conduit 40. A radially enlarged flange 13 is provided at the other end of the body, referred to as the outer end, and formed as a hex nut to enable the threading of the valve into and out of the conduit 40.

Figure 1:
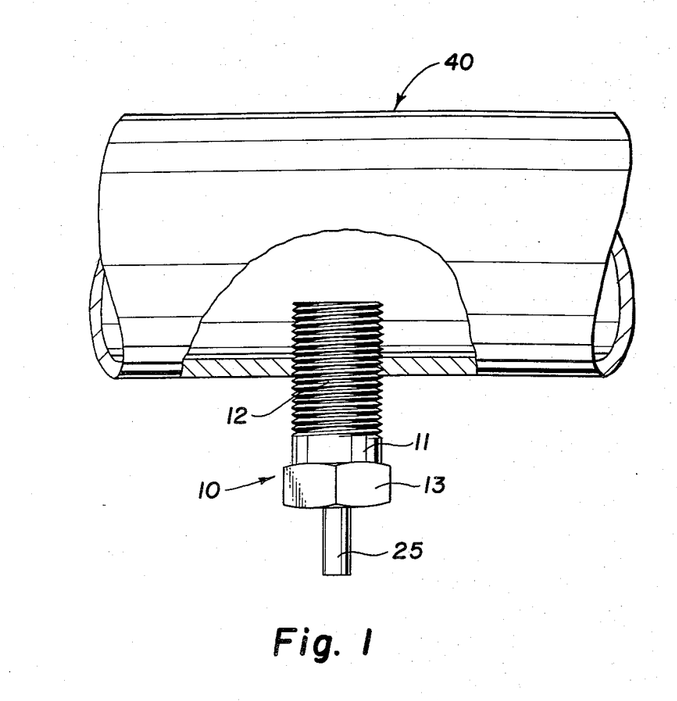
FIG. 1 is a side elevation view of one form of valve according to the invention assembled with a water supply conduit, with the conduit partially broken away.
Figure 2:
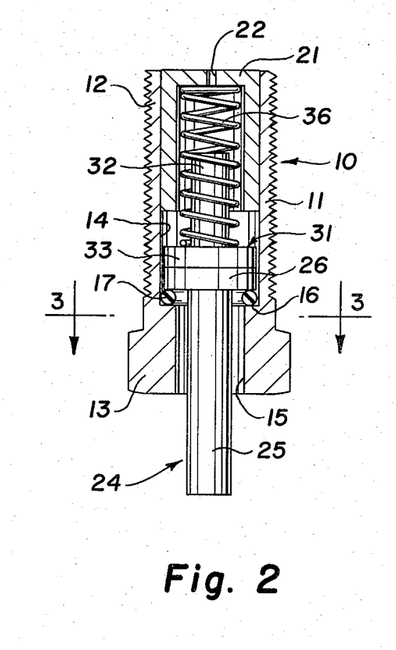
FIG. 2 is a longitudinal sectional view of the valve of FIG. 1, with the valve closure member seated.
Figure 3:
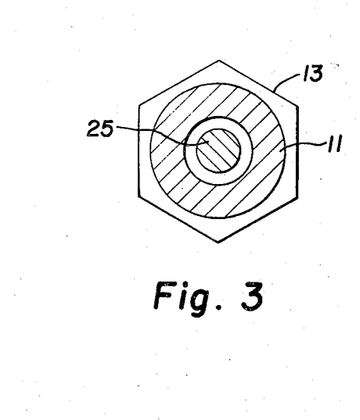
FIG. 3 is a transverse sectional view taken along the line 3—3 of FIG. 2.

The valve body has a through bore including a larger bore 14 opening to the inner end of the body, a smaller bore 15 opening to the outer end of the body, with the bores being separated by a transverse shoulder 16 defining the valve seat. An O-ring or other suitable gasket 17 is provided on the valve seat for appropriate sealing.

The larger bore 14 of the valve body is closed by an elongated cup-shaped plug 21 secured in the bore with a press fit, with a relatively deep axial recess opening inward. The base of the plug is provided with a water inlet port 22. The inner end of the plug confronts, and is spaced from, the valve seat 16 to define the valve chamber.

Figure 4:
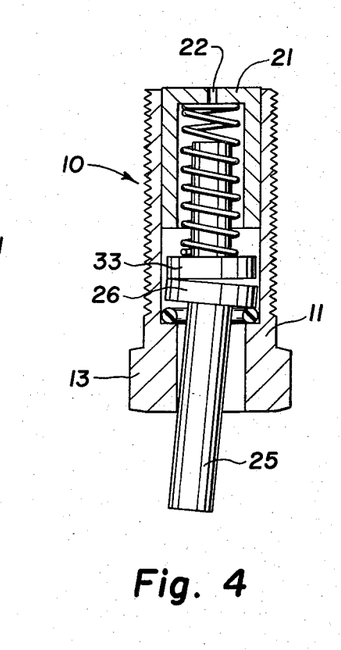
FIG. 4 is a view like FIG. 2, showing the valve closure member rocked to an open condition.

A valve closure member 24 consists of an elongated stem 25 having an enlarged, flat, circular head 26 dimensioned to seat on the valve seat. The head is dimensioned to have sufficient annular clearance with the valve chamber walls for adequate water flow around the head. The closure member stem 25 is smaller in cross section than the smaller bore 15 to allow rocking of the valve closure member, as illustrated in FIG. 4, to open the valve to allow ample water flow; and the stem projects sufficiently from the outer end of the valve body for ready operation by the animal or fowl for which the valve is designed.

A control assembly, for urging the valve closure member 24 into engagement with the valve seat, includes a control member 31 and a helical compression spring 36 coacting with the valve body and plug. The control member consists of an elongated stem 32 having an enlarged, flat, circular head 33 at one end; the head having a small annular clearance with the walls of the valve chamber. The helical spring surrounds the stem 32; and the stem, the spring and the recess of the plug 21 are dimensioned relative to each other that the spring is confined between the plug recess and the stem in a manner to allow free axial movement for compression and expansion, but to substantially prevent lateral movement of the stem and flexure of the spring. This coacting configuration, along with the relatively close clearance between the control member head 33 and the valve chamber, restricts severely any lateral movement of the control member 31 so that its movement is essentially axial during the operation of the valve; and correspondingly the movement of the compression spring 36 during compression and expansion is substantially axial.

As mentioned, the recess of the plug 21 is relatively deep to accommodate a quite long helical spring 36, the spring being desirably long to provide the desired spring force and at the same time have a wire size of sufficient strength for ruggedness and durability. This is particularly important in valves of very small size, for use by very young fowl, where the springs become quite fragile. To provide for appropriate confinement of the spring and also appropriate confinement of the control member 21 against lateral movement, the stem 32 is also relatively long. The length of the stem 32 is desirably less than the depth of the plug recess so that the coaction of the head 33 with the inner end of the plug provides a limit stop, while maintaining clearance between the end of the stem and the port 22 to allow continued water flow.

There is necessarily an annular clearance space between the control member head 33 and the valve chamber, to allow water flow; however, the relationship of the parts is such that the permitted lateral movement of the head 33 is not sufficient to move the spring 36 into engagement with the recess walls of the plug 21, and particularly not sufficient to allow such engagement that the coils of the spring can hang up on the inner lip of the plug recess.

The confronting flat faces of the heads of the closure member and control member engage each other; and the valve closure member is seated on the valve seat by the action of the control assembly. The clearance between the valve seat 17 and the inner end of the plug 21 is sufficient to allow desired axial movement of the closure member and control member for the desired amount of water flow, whether the closure member is moved directly axially by the animal to open the valve or whether it is rocked to the open position illustrated in FIG. 4. During the rocking action as seen in FIG. 4 one edge of the closure member effects upward movement of the control member 31; however, the movement of the control member 31 is essentially axial as above described. Hence there is no lateral flexure of the spring 36 which may produce premature fatigue failure. Also there is no opportunity for the spring to be jammed between the control member 31 and the plug 21.

In this design, since the confronting faces of the closure member and control member's head are flat and are disposed in planes perpendicular to the axes of the respective members, when the closure member is returned to the seated position illustrated in FIG. 2, the closure member is caused to be seated very squarely on the valve seat O-ring 17; and this assures a tight closing of the valve to prevent any leakage and the obvious disadvantages of leakage.

Figure 5:
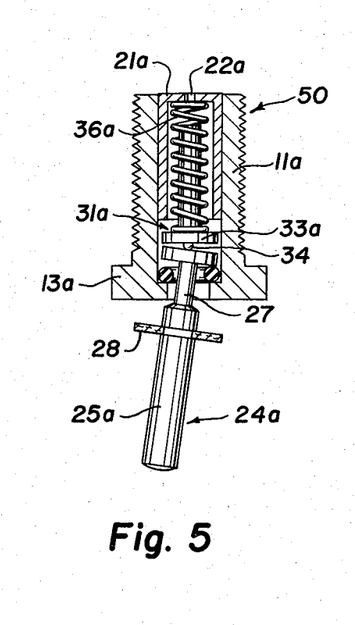
FIG. 5 is a longitudinal sectional view of an alternative form of valve according to the invention, with the closure member rocked to an open condition.
Figure 6:
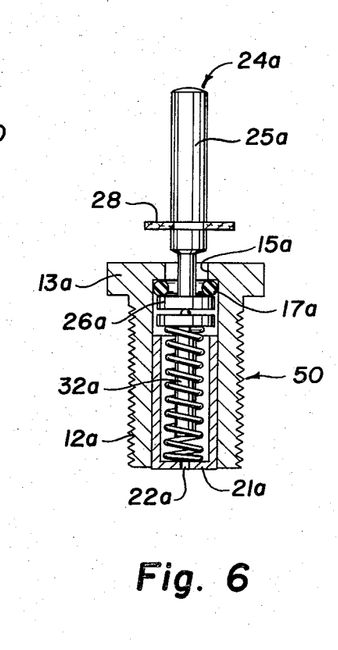
FIG. 6 is a view like FIG. 5, with the valve inverted and the closure member seated.

EMBODIMENTS OF FIGS. 5 AND 6

FIGS. 5 and 6 of the drawing illustrate an alternative form of valve 50 according to the invention wherein the components and structural features of the valve are substantially identical to those of the above described valve, and where corresponding parts and structural features will be identified by the same reference numbers with the subscript "a". In FIG. 5 the valve 50 is illustrated in the suspended position, similar to the previously described valve 10; and in FIG. 6 the valve is illustrated in the inverted position such as it might occupy when placed in the bottom of a drinking cup, for example. This valve includes some additional structural features, and is particularly designed for very easy operation by very small animals or fowl, such as small chicks.

In the valve 50 the smaller bore 15a is very shallow, more in the form of a port provided in an inner radial flange an the outer end of the body 11a. For coaction with this shallow bore 15a, the closure member stem 25a is provided with a reduced diameter neck 27 adjacent to the head 26a. This reduced diameter neck has sufficient strength to extend through the smaller bore or port 15a, thereby allowing a greater swinging action of the valve closure member 24a.

Also in this form of valve 50, the control member head is provided with a central projecting boss 34 which engages the head 26a of the closure member and effects the seating of the valve closure member. With this arrangement there is a different leverage affecting the lifting of the control member against the compression spring 36a, this being effective to provide lesser spring resistance to the rocking of the closure member illustrated in FIG. 5. Accordingly, with lesser effective spring resistance and a greater allowable swing of the valve, the valve is easier to open by very small chicks. Also, the length of the projecting stem 25a may be less, again providing for easier operation by small chicks.

A structural feature which diverts the flow of water along the stem is a deflector 28, in the form of a flat washer, located on the stem by means of a suitable annular groove 29 adjacent to the outer end of the body 11a. One function of the deflector 28 is to tend to hold the water, or a quantity of water, at the end of the stem near the outer end of the valve body, since this is the area where the fowl tend to receive the water from the valve. This allows a buildup of a quantity of water between the deflector and the valve body to facilitate the drinking of water by the fowl or other animals. An additional function of the deflector, in the FIG. 5 configuration, is that it will tend to hold water droplets at the valve stem after the valve has closed and thereby help to keep the litter dry, when the valve is used for fowl. When the valve 50 is used in the inverted position illustrated in FIG. 6, in association with a drinker or cup for example, the deflector 28 provides some additional functions. Since it overlies the smaller bore opening 15a, it serves to prevent trash from falling directly into the opening to possibly interfers with the seating of the valve closure member. Additionally, when the valve is opened, it serves to deflect the water radially so that it will wash away any debris from the upper face of the valve body 11a and further prevent the possibility of trash entering the outlet opening 15a to interfere with the valve operation.

An additional function of the deflector 28 is that it defines a form of limiting rib engaged by the beak of the animal, so that the leverage point for the tilting the stem 25 is spaced further from the pivot of the closure member.

Figure 7:
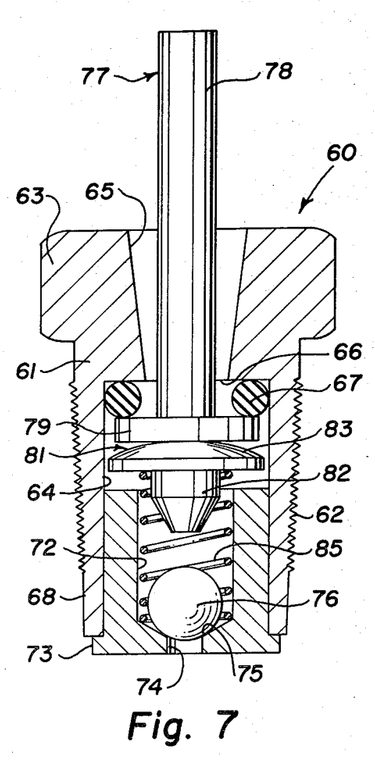
FIG. 7 is a longitudinal sectional view of a modified form of valve, with the closure member stem extending up as in FIG. 6.
Figures 8, 9, 10, 11:
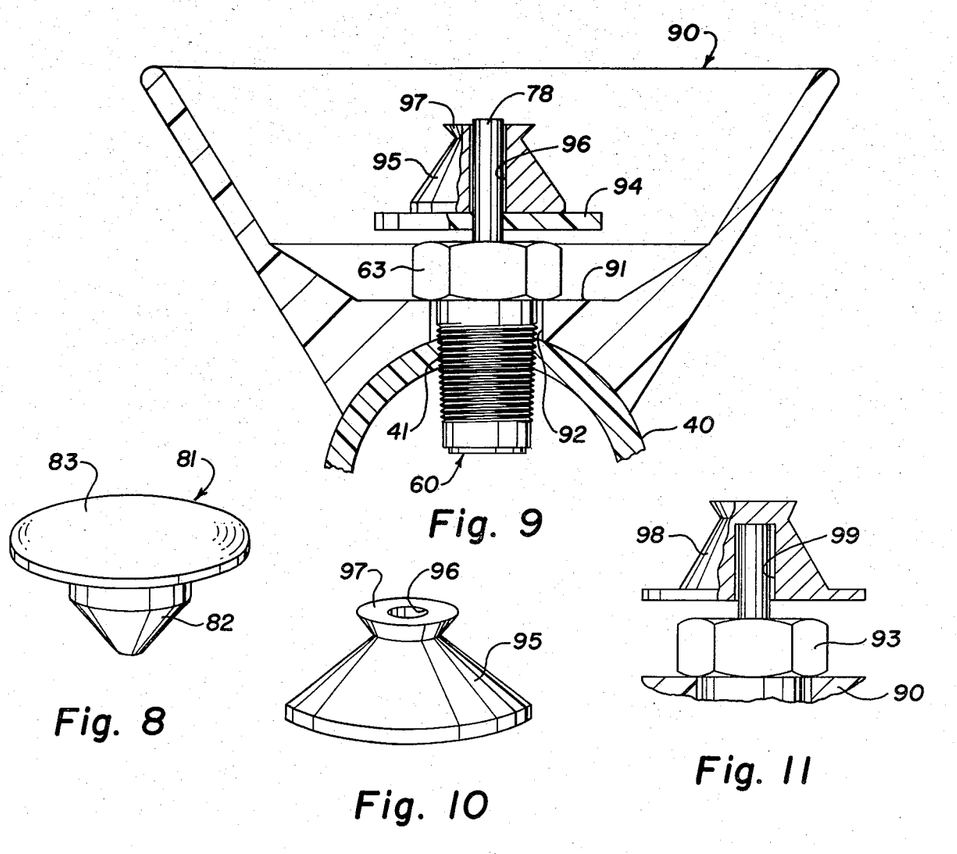
FIG. 8 is a perspective view of the control member of the valve of FIG. 7.
FIG. 9 is a side elevation view of the valve of FIG. 7 within a drinker cup, shown in section, secured to a conduit by the valve, and including a valve operator associated with the valve stem.
FIG. 10 is a perspective view of the valve operator of FIG. 9.
FIG. 11 is a fragmentary view, partially in section, of a modified form of valve operator for the valve cup combination shown in FIG. 9.

EMBODIMENTS OF FIGS. 7 AND 8

FIGS. 7 and 8 of the drawing illustrate another modified form of valve according to the invention. FIG. 7 illustrates a valve which is particularly designed for use by very young chicks and can be readily operated by such chicks. Typical dimensions for such valve will be set forth subsequently. The structure of this valve 60 is generally similar to that illustrated in FIG. 2, and includes an elongated body or housing 61 having external pipe threads 62 along the body adjacent to the inner end, and having a hex flange 63 at the outer end. The threads are in the form of pipe threads, that is slightly tapered, and the threads are relieved at the inner end to provide a lead 68 to guide the housing into a bore provided in the conduit 40. The threads 62 are preferably of a self-threading type so that the bore in the conduit 40 need not be threaded. Rather, when the valve is threaded into an unthreaded bore the valve threads will form mating threads in the conduit material; and by the nature of the threads, the valve body is tightly sealed in the conduit.

Referring further to the structure of the valve housing 61, it includes a cylindrical chamber 64 opening from the inner end and an axial passage 65 opening from the chamber to the outer end and defining an annular shoulder 66 which serves as a valve seat. An O-ring 67 seats on the valve seat for coaction with the closure member. The passage 65 may be tapered, being larger at its outer end to enable the desired lateral movement of the valve stem.

A cap 71 for closing the inner end of the housing chamber 64 is a cup-shaped member having a cylindrical recess 72. The cap is dimensioned for a press fit with the walls of the chamber 64, and is provided with a flange 73 at its outer end to engage the inner end of the housing body and thereby fix the location of the cap relative to the body. The cap is provided with an axial port 74 opening to the recess 72; and a surrounding beveled annular shoulder 75 defines a seat for a ball check valve 76. The ball check valve functions to prevent siphoning of water from the valve chamber 64 should a negative pressure occur within the conduit.

With the housing cap 71 assembled with the housing body 61, there is some space between the housing seat 66 and the confronting end face of the cap 71. The valve closure member 77 includes an elongated stem 78 and an enlarged generally planar head 79, which head seats on the O-ring 67 and occupies a portion of that space within the chamber 64. A control member 81 consists of a relatively short axial stem 82 and a radially enlarged head 83. The head 83 is a domed head, the distal face thereof having a rounded, convex, generally spherical face confronting the flat face of the valve closure member head. This domed head configuration provides for relative rolling action when the closure member 77 is rocked relative to its seat; and this rolling action provides for easier operation of the valve, requiring a lesser lateral force on the stem 78 to open the valve than would be required if the closure member and control member have confronting planar faces as in the FIG. 2 embodiment. This easier operation is important for valves which are to be operated by newly hatched chicks, from one to four days old, for example.

A helical compression spring 85 is compressed within the cap recess 72, being received over the control member stem 82 and bearing on the head, with the other end of the spring bearing on the cap shoulder 74. This spring is compressed to urge the control member 81 against the head of the valve closure member 77 to effect the seating of the closure member on the seat O-ring 67 to close the valve.

The relative dimensions of the above described parts are important. The outer diameter of the compression spring 85 is only slightly smaller than the inner diameter of the cap recess 72 so that the spring is very closely confined within the recess against axial movement. The diameter of the control member stem 82 is only slightly smaller than the inner diameter of the spring; and the shank portion of the stem 82 extends at least partially into the cap recess 72 so that, through the coaction of the cap, the spring and the stem only very slight lateral movement of the stem is permitted. It will also be noted that the outer diameter of the control member head 83 is only slightly smaller than the inner diameter of the housing chamber 64 so that only very slight lateral movement of the head relative to the body 61 is permitted. With these relative dimensions, the movement of the valve control member 81 must be essentially axial when the valve closure member is rocked. It will also be seen that the axial movement of the valve control member is very limited since in the illustrated closed position of the valve there is small axial clearance between the confronting faces of the cap inner end and the control member head. It should also be noted that the diameter of the valve ball 76 is smaller than the inner diameter of the spring so that the ball moves very freely to perform its function as a check valve.

The following is an example of the dimensions of a valve of a type illustrated in FIG. 7 which is designed for operation by newborn chicks. The overall length of the housing body 61 is eleven sixteenths inch and the inner diameter of the chamber 64 is nine thirty seconds inch. The overall length of the valve closure member is eleven sixteenths inch. The outer diameter of the control member domed head 83 is about eight thirty seconds inch, only slightly smaller than the inner diameter of the chamber. The inner diameter of the housing cap recess 72 is about five thirty seconds inch in relation to the outer diameter of the control member stem 82 which is about four thirty seconds inch, allowing a small annular space for the helical spring 85. It will be seen then that the control member stem is closely confined laterally within the cap recess. The spring 85 is fabricated from 0.009 inch wire and has a compressed length of about one quarter inch.

EMBODIMENT OF FIGS. 9, 10, AND 11

FIG. 9 of the drawing illustrates the valve 60 of FIG. 7 disposed within a generally conical drinker cup 90 which is secured to a conduit 40 by means of the valve 60. As seen in the drawing, the chamber of the cup 90 includes a flat base 91, the base provided with an axial bore 92 dimensioned to pass the body 61 of the valve. The threaded body is threaded into a suitably dimensioned port 41 in the wall of the conduit, this bore being dimensioned slightly larger than the lead 68 of the valve body so that the body when threaded into the port 41 will self-form threads in the conduit wall and be tightly sealed with the conduit. The underface of the hex flange 63 seats on the cup base 91 to clamp the cup in secure relation with the conduit. It will be seen that the valve closure stem 78 extends upwardly axially within the cup chamber.

When valve-cup combinations of this type are provided for new chicks, it is known practice to provide float balls in the cups which function to attract the chicks, which have a suitable mass and dimension that when the water level lowers to a preselected level, such balls will wedge between the inner cup wall and the stem 78 to deflect the stem and open the valve. Water flows into the cup then until the level raises sufficiently to allow the floating ball to move away from the stem which closes under the urging of the biasing spring as well as the water pressure. A disadvantage of this arrangement is that the water level in the cup is quite high and that the young chicks will not reach to the base of the cup chamber while drinking to remove dropped food particles, and that such food particles might pass into the valve passage 65 and possibly prevent full seating of the closure member.

FIG. 9 illustrates the use of a valve operator in combination with the valve stem 78 which eliminates the need for such floating balls and provides some additional advantages.

The valve operator illustrated in FIG. 9 includes the combination of a flat washer or disk 94, fabricated of Teflon for example, and a generally conical metallic body 95. The washer 94 has an axial bore dimensioned for a friction fit with the valve stem 78 so that this washer, when slipped over the stem, will retain its position. The operator body 95 has an axial passage 96 dimensioned to pass the valve stem, and has a knob 97 at its upper smaller end to enable grasping of the body to remove the body from the valve when desired. In assembled relation, the larger base of the operator body rests on and is supported by the washer 94. The washer 94 has a diameter so related to the adjacent wall of the cup recess that the chicks, when seeking water at the bottom of the cup recess, will nudge the operator to open the valve. This has the advantage that the valve will only be open at such time as the operator is nudged by the chicks; and this means that the water level will remain lower in the cups since the operator will be nudged less as the level increases. With the chicks seeking water at a lower level in the cup, the cups will stay cleaner since the chicks will also remove the food particles which otherwise might accumulate in the bottom of the cup. The accumulation of such particles is a disadvantage since they might on occasion flow into the valve passage 65 and possibly prevent the closure member from seating fully.

It has been observed that with an operator body of selected mass, the lateral force required to move the valve stem sufficiently to open the valve is about one fifth of that which would be required with the disk 94 alone. This then is an additional advantage in the training of newborn chicks to drink from a waterer of this type.

FIG. 11 illustrates a similar form of operator body 98 having an axial recess 99 again dimensioned to receive the valve stem 78 by terminating short of the upper end of the body; and the operator may be provided with an integral radial flange at the base to provide the desired base diameter. The operator may weigh ¼ ounce.

FEATURES AND ADVANTAGES

What has been described is unique nibbler-type valve having an elongated helical compression spring for urging the seating of the valve closure member, and having unique means for mounting and confining the spring to prevent lateral movement thereof which may result in early spring failure; and thereby to provide a valve of this type having a long life.

A particular feature of the valve construction is that it is simple in structure and therefore relatively economical to manufacture, and yet provides the desired ruggedness and durability.

A particular advantage of this structure is that very small valves can be designed for use with very small fowl for example, involving the use of relatively long and fragile helical compression springs, with the springs, despite their fragility, providing reliable action and long life.

Another feature of the invention is the structural design enabling ease of operation by very young fowl.

Still another feature and advantage of the invention is the structure for retaining or collecting the water adjacent to the outlet end of the valve body to facilitate drinking by fowl and other animals, and also to retain and minimize the dripping of the valve immediately following the closure.

An additional feature of the invention is the provision of a protective shield for the valve opening when the valve is used in a cup arrangement with the valve outlet facing upward, to prevent debris from entering the valve opening and interfering with the proper seating of the valve closure member.

A further feature and advantage of the invention is the use of valves of the type described with a drinker cup, to enable fowl, including young chicks, to drink from cups which are self supplied with water. An ancillary feature is the provision of a check valve feature within the nibbler valve to enable free flow of the water from the supply conduit into the cup, but to prevent siphoning of water, and possibly food particles dropped into the cup, back into the supply line should a negative pressure appear in the supply line adjacent to a particular cup.

Another feature related to the valve-cup combination, is a unique valve actuator weight associated with the operator stem to assist newly hatched chicks in learning to drink from a watering cup.

While preferred embodiments of the invention have been illustrated and described, it will be understood by those skilled in the art that changes and modifications may be resorted to without departing from the spirit and scope of the invention.

What is claimed is:

1. A valve comprising
a housing having a cylindrical chamber,
a passage opening from said chamber, and means in said chamber surrounding said passage defining a valve seat;
a valve closure member comprising an elongated stem with a radially enlarged head at one end; said head being configured to seat said valve seat; said stem being dimensioned for clearance with said passage, and to project from said housing thereby enabling rocking of said valve closure member;
a valve control member comprising an axial stem with a radially enlarged head at one end; said control member head having a circular periphery, the diameter of said circular periphery being substantially the same as the diameter of said cylindrical chamber to prevent lateral movement of said head; said control member being disposed in said chamber with its head confronting and engaging said closure member head, and with its stem extending axially away from said closure member.
a helical compression spring disposed over said control member stem and enclosing said stem, for urging said control member toward said closure member; said control member stem being cylindrical, and having a diameter substantially the same as the inner diameter of said helical compression spring, to prevent lateral movement relative to each other;
said housing having cylindrical recess means opening from said chamber for receiving and confining a portion of said helical spring, including bearing means for the end of said spring remote from said control member; said recess means having a diameter substantially the same as the outer diameter of said helical compression spring, to prevent lateral movement of the portion of said spring disposed within said recess means; a distal portion of said control member stem, surrounded by said spring, being disposed always within said housing recess means;
said spring and said valve control member being thereby confined in said housing, for axial movement without lateral movement; and said control member being urged by said spring to seat said valve closure member on said valve seat.

2. A valve as set forth in claim 1
said housing being axial and having an axial chamber; said passage opening from said chamber being an axial passage;
said housing recess means opening axially from said housing chamber; and said spring and valve control member being confined for movement along the housing axis.

3. A valve as set forth in claim 1
a cup-shaped member disposed within said housing chamber, having an inward opening cylindrical recess defining said recess means for receiving and confining said spring.

4. A valve as set forth in claim 3
the inner annular end of said cup-shaped member confronting the head of said valve control member to limit axial movement thereof.

5. A valve as set forth in claim 3
said cup-shaped member having an axial flow passage at its base end; the base of said spring confining recess being configured to define a valve seat, and a second valve closure member disposed in said recess for sealing engagement with said seat.

6. A valve as set forth in claim 3
said cup-shaped member being dimensioned for a friction fit within said housing chamber, and having external annular flange means for engagement with the housing inner end wall to limit movement of said member into said housing chamber.

7. A valve as set forth in claim 1
one of the confronting faces of said valve closure member and said valve control member having a domed surface, whereby the rocking of said valve closure member produces a partially, at least, rolling engagement of said confronting faces.

8. A valve as set forth in claim 7
said valve control member having said domed face.

9. A valve as set forth in claim 1
a drinker cup having an axial passage in its base for receiving said valve housing in sealing relation; said closure member stem projecting axially into said drinker cup.

10. A valve as set forth in claim 9
a valve operator disposed over the distal end of said closure member stem; said operator having a mass to assist the rocking of said closure member relative to said valve housing; said operator having a lateral peripheral dimension larger than that of said valve housing, whereby said operator is engaged by animals drinking from said cup.

11. A valve as set forth in claim 10
said valve operator having a generally conical shape, and disposed with its larger base end confronting the outer end of said valve housing and the base of said drinker cup.

12. A valve as set forth in claim 1
said housing having external threads for threading said valve into a hole in a conduit; said threads comprising a self-threading type thread for forming mating threads in a conduit hole; and said threads terminating short of said housing inner end to define a lead for entering the conduit hole.

13. A valve as set forth in claim 12 said housing threads being tapered threads to form a sealed threaded connection with the hole of the conduit.

14. A valve as set forth in claim 1
said closure member head and said control member head being circular and having flat confronting faces of substantially identical dimensions; said flat confronting faces effecting the square seating of said closure member on said valve seat; and the periphery of said closure member head effecting the axial movement of said control member against the force of said spring when said closure member is rocked relative to said valve seat.

15. A valve as set forth in claim 1
said closure member head and said control member head having confronting faces; one of said faces having a central boss projecting therefrom for engagement with the other of said faces; and the coacting engagement of said boss with its mating face effecting the axial movement of said control member against the force of said spring.

16. A valve as set forth in claim 1
said closure member stem having a reduced diameter neck portion adjacent to its head; said housing passage being shallow, and said reduced diameter neck portion extending through said passage, to allow substantial rocking of said closure member.

17. A valve as set forth in claim 1
an annular radially extending deflector mounted on said stem adjacent to said housing outer end to restrain water flowing from said valve.

18. A valve as set forth in claim 17
said annular deflector being substantially larger in radial extent than said housing passage.

* * * * *

UNITED STATES PATENT AND TRADEMARK OFFICE
CERTIFICATE OF CORRECTION

PATENT NO. : 4,402,343
DATED : September 6, 1983
INVENTOR(S) : Earl C. Thompson et al It is certified that error appears in the above-identified patent and that said Letters Patent are hereby corrected as shown below:

Claim 1, column 9, line 35     before "said" (first occurrence) insert --on--.

Signed and Sealed this

Thirty-first Day of January 1984

[SEAL]

Attest:

GERALD J. MOSSINGHOFF

*Attesting Officer*      *Commissioner of Patents and Trademarks*